(12) United States Patent
Oshiro

(10) Patent No.: US 6,317,667 B1
(45) Date of Patent: Nov. 13, 2001

(54) METHOD FOR DETECTING A DECREASE IN TIRE AIR-PRESSURE AND APPARATUS USED THEREFOR

(75) Inventor: Yuji Oshiro, Kakogawa (JP)

(73) Assignees: Sumitomo Rubber Industries, LTD, Hyogo-ken; Sumitomo Electric Industries, Ltd., Osaka-fu, both of (JP)

( * ) Notice: Subject to any disclaimer, the term of this patent is extended or adjusted under 35 U.S.C. 154(b) by 0 days.

(21) Appl. No.: 09/466,126

(22) Filed: Dec. 21, 1999

(30) Foreign Application Priority Data

Dec. 25, 1998 (JP) .................................................. 10-369831

(51) Int. Cl.[7] .................................................. G06F 17/00
(52) U.S. Cl. .................................. 701/29; 701/1; 701/114
(58) Field of Search .................................. 701/29, 35, 71, 701/72, 76, 144, 1

(56) References Cited

U.S. PATENT DOCUMENTS 5,193,387 * 3/1993 Hodate ............................... 73/146.5
5,578,984 * 11/1996 Nakajima ............................ 340/444
5,826,210 * 10/1998 Izumi et al. ........................... 701/70

FOREIGN PATENT DOCUMENTS 63305011   12/1988 (JP) .

* cited by examiner

Primary Examiner—Tan Nguyen
(74) Attorney, Agent, or Firm—Birch, Stewart, Kolasch & Birch, LLP

(57) ABSTRACT

A method and an apparatus for detecting a decrease in tire air-pressure based on rotational information obtained from tires of a four-wheeled vehicle, wherein memories of iso-kinetic random access memory devices used for starting judgment of decompression from the beginning are cleared in case it is judged that a normal internal pressure has been assumed after a tire has been judged to be in a decompressed condition. It is prevented that the apparatus repeatedly but erroneously judges a decompressed condition to generate an alarm immediately after judging a normal internal pressure condition.

4 Claims, 3 Drawing Sheets

METHOD FOR DETECTING A DECREASE IN TIRE AIR-PRESSURE AND APPARATUS USED THEREFOR

BACKGROUND OF THE INVENTION

The present invention relates to a method for signaling a decrease in tire air-pressure and an apparatus used therefor. More particularly, the present invention relates to a method for signaling a decrease in tire air-pressure and to an apparatus used therefor capable of properly judging that decrease in internal pressure has occurred in any of tires attached to a vehicle equipped with a limited slip differential device (LSD) and accordingly generating an alarm.

It is conventionally known that a dynamic load radius of a tire becomes small in the case where the air-pressure in the tire is decreased, and that the rotational velocity or rotational angular velocity becomes faster than that of a tire having normal air-pressure. For instance, there is proposed a method for detecting a decrease in the internal pressure of a tire based on the relative differences in the rotational angular velocities of the tires (see, for instance, Japanese Unexamined Pat. Publication No. 305011/1988).

A method for judging an alarm in a conventional apparatus for detecting a decrease in air-pressure is generally performed through the following steps.

1) A judgment value is calculated at each specified interval (e.g., every second).
2) In case a specified amount of judgment values have been stored (e.g., five values), an average value of these values is calculated.
3) In case a specified amount of average values have been stored (e.g., twelve values), another average value of these values is calculated and decompression is judged on the basis of this average value.

In the above arrangement, each of the values which have been obtained in the steps of 1) to 3) are stored in RAMs (isokinetic random access memory devices), while judgment values obtained in the decompressed condition, for instance, twelve values remain in some of the RAMs when the process returns from a step of judging decompression of a tire to a step of judging normal internal pressure. Therefore, there exists a fear that it might be judged that a judgment value close to a decompressed condition is a false alarm due to variations in judgment values for running data obtained after judging that a normal internal pressure has been assumed even though the tire might be in a normal condition.

Among recent vehicles, there are some which are equipped with a limited slip differential device at a differential gear of a driving shaft for the purpose of improving running performances at the time of, for instance, cornering. The mechanism of the limited slip differential device is so arranged that the differential is restricted until a differential torque exceeds a set value and the driving wheels are rotated at identical velocities on the right and left.

In a vehicle equipped with such a limited slip differential device, judgment of alarm in the above steps 1) to 3) is performed separately for a region in which differential is limited (straight line region) and for a region in which differential is not limited (turning region). Although methods for judging an alarm are somewhat different from each other, there also exists the danger that a value is judged to be a false alarm due to similar reasons as for conventional apparatus for detecting a decrease in air-pressure.

The present invention has been made in view of these facts, and it is an object of the invention to provide a method for determining a decrease in tire air-pressure and an apparatus used therefore capable of properly determining the decrease in internal pressure of a tire.

SUMMARY OF THE INVENTION

In accordance with the present invention, there is provided a method for signaling a decrease in tire air-pressure which detects a decrease in the internal pressure of a tire based on the rotational information obtainable from tires of a four-wheeled vehicle, wherein the memory of isokinetic random access memory devices used for judging initial decompression are cleared in the case it is judged that a normal internal pressure has been assumed after a tire has been judged to be in a decompressed condition.

In accordance with the present invention, there is also provided an apparatus for signaling a decrease in tire air-pressure which detects a decrease in the internal pressure of a tire based on the rotational information obtainable from tires of a four-wheeled vehicle. The apparatus includes a running memory clearing means for clearing the memory of isokinetic random access memory devices used for judging initial decompression in the case where it is judged that a normal internal pressure has been reassumed after a tire has been initially judged to be in a decompressed condition.

In accordance with the present invention, there is further provided a method for signaling a decrease in tire air-pressure which detects a decrease in the internal pressure of a tire based on the rotational information obtainable from tires of a four-wheeled vehicle equipped with a limited slip differential device. When it is judged that normal internal pressure has been reassumed, after a tire has been initially judged to be in a decompressed condition, when the vehicle is performing running in a substantially straight manner in a region in which the driving wheels are rotating at identical velocities, the memory associated with the isokinetic random access memory devices corresponding to straight-ahead running are cleared. Also, in the case where it is judged that a normal internal pressure has been reassumed after a tire has been initially judged to be in a decompressed condition when the vehicle is performing turning movements in a region in which the driving wheels are not rotating at identical velocities, memory of the isokinetic random access memory devices corresponding to the straight-ahead running and the turning movements are cleared.

In accordance with the present invention, there is yet further provided an apparatus for signaling a decrease in tire air-pressure for detecting a decrease in the internal pressure of a tire based on rotational information obtainable from tires of a four-wheeled vehicle provided with a limited slip differential device, wherein the apparatus includes a running memory clearing means which clears memories of isokinetic random access memory devices corresponding to only straight-ahead running in case it is judged that a normal internal pressure has been reassumed after a tire has been judged to be in a decompressed condition when the vehicle is performing running in a substantially straight manner in a region in which driving wheels are rotating at identical velocities. Memories of isokinetic random access memory devices corresponding to straight-ahead running and turning movements, in the case it is judged that a normal internal pressure has been reassumed after a tire has been judged to be in a decompressed condition, are cleared when the vehicle is performing turning movements in a region in which the driving wheels are not rotating at identical velocities.

DETAILED DESCRIPTION

The method and apparatus for signaling a decrease in tire air-pressure according to the present invention will now be explained based on the accompanying drawings.

Figure 1:
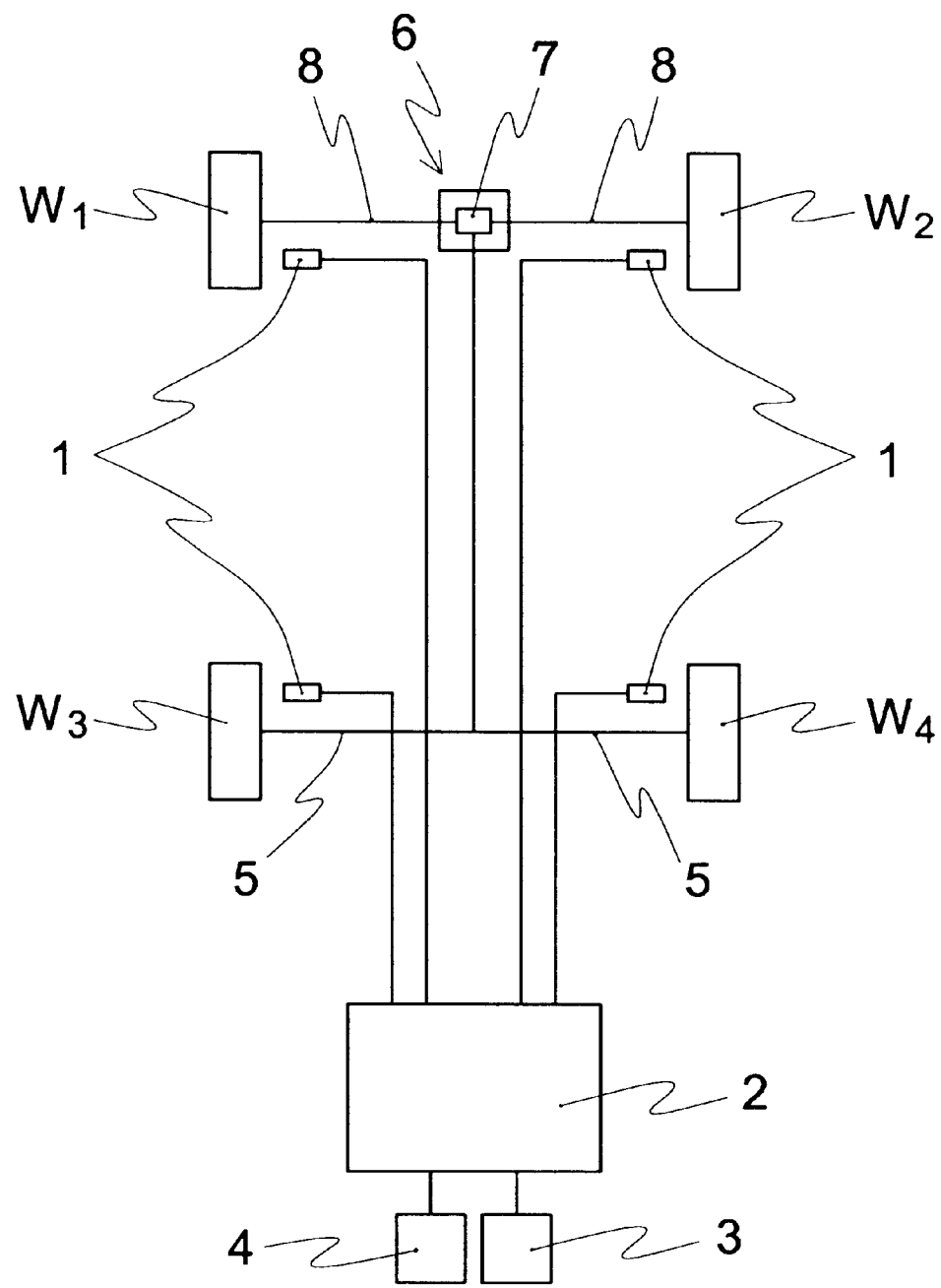
FIG. 1 is a block diagram showing one embodiment of an alarm system which signals a decrease in tire air-pressure according to the present invention.
Figure 2:
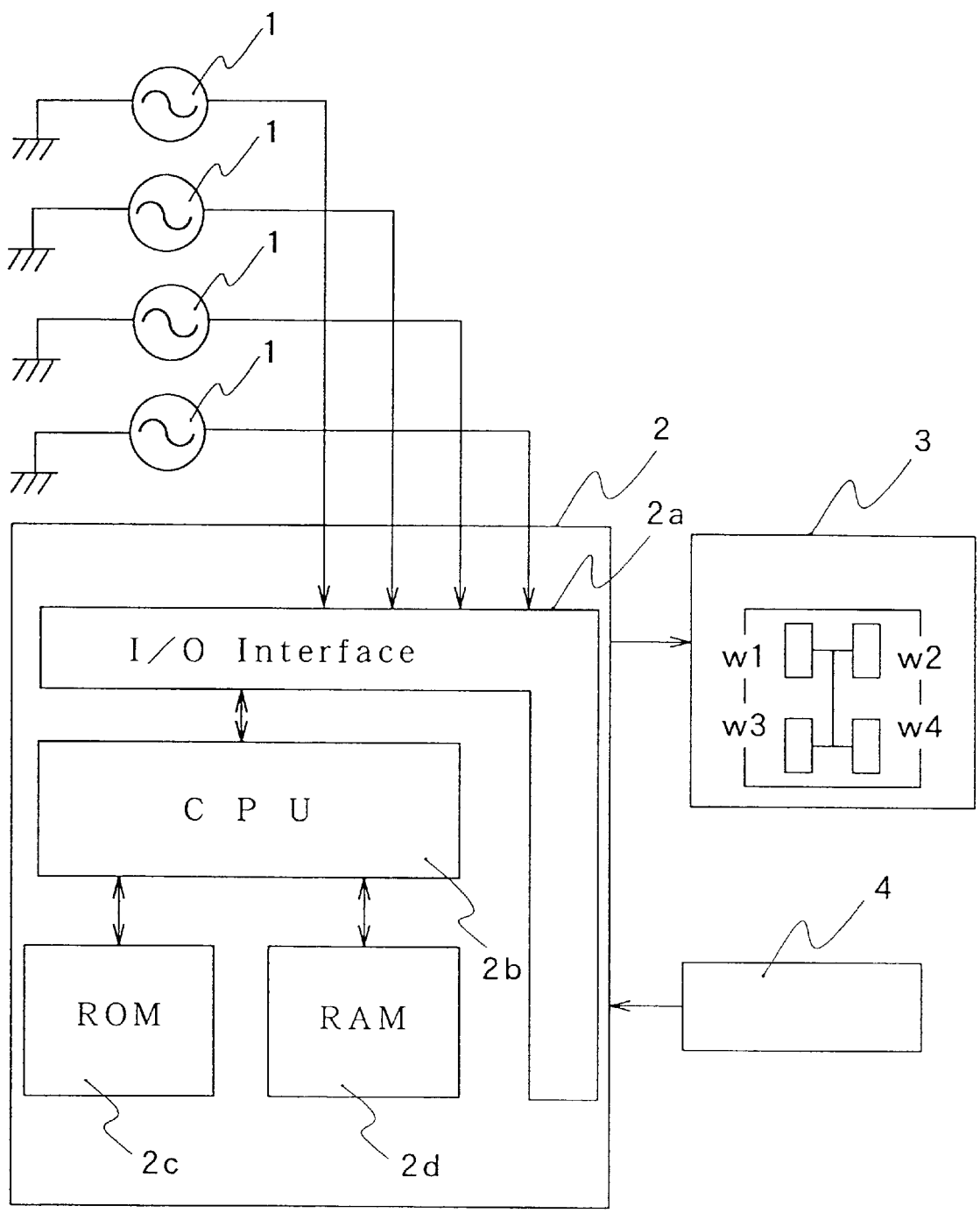
FIG. 2 is a block diagram showing the electrical arrangement of the alarm system signaling a decrease in the tire air-pressure of FIG. 1.

As shown in FIG. 1, the apparatus for signaling a decrease in air-pressure is designed to judge whether air-pressure in any of the four wheels $W_1$, $W_2$, $W_3$ and $W_4$ of the driving wheels and following wheels attached to a four-wheeled vehicle has decreased or not. Thus, ordinary wheel speed sensors 1 which are respectively provided in connection with each of the tires $W_1$, $W_2$, $W_3$ and $W_4$ as well as a control unit 2, are provided. Each wheel speed sensor 1 detects the rotational information of each tire such as number of rotations, rotational velocity and rotational angular velocity. Outputs of the wheel speed sensors 1 are supplied to the control unit 2. To the control unit 2, there are connected a display 3 comprising a liquid crystal display device, a plasma display device, or CRT for notifying a tire $W_1$, W2, $W_3$ and $W_4$ of which air-pressure has decreased, and a switch 4 which might be operated by the driver. As shown in FIG. 2, the control unit 2 comprises an I/O interface 2a required for sending/receiving signals to/from an external device, a CPU 2b which functions as a center of calculation, a ROM (memory device for read out only) 2c which stores a control operation program for the CPU 2b, and a plurality of RAMs (isokinetic random access memory devices) 2d into which data are temporarily written and from which data are read out when the CPU 2b performs control operations.

In this embodiment, each wheel speed sensor 1 serves as a rotational information detecting means, and the control unit 2 includes a velocity calculating means, turning radius calculating means, calculating means for acceleration in the lateral direction (hereinafter called "lateral G"), judging means as well as running memory clearing means, wherein the running memory clearing means further includes a straight-ahead running memory clearing means and a turning movement running memory clearing means. The judging means judges a decrease in internal pressure (decompression) of a tire after performing a correction based on a turning radius or a value of lateral G. It should be noted that "straight-ahead running" indicates a condition in which the vehicle is running in a substantially straight-ahead manner in a region in which the driving wheels are rotating at identical velocities, and "turning movements" a condition in which the vehicle is driving in a region in which the driving wheels are not rotating at identical velocities.

A four-wheeled vehicle is generally equipped with an apparatus for signaling a decrease in air-pressure for sampling a plurality of data related to judgment values and obtaining an average of these, and in case it is judged during driving that a tire is in a decompressed condition, the driver is notified of this fact through the display 3. Upon receipt of the information, the driver takes suitable measures such as filling air into the decompressed tire or exchanging the decompressed tire to return the air-pressure to a normal condition. In this manner, the display 3 is made to recover to a condition in which it is judged that a normal internal pressure has been reassumed. However, since several judgment values which have been obtained when the tire was in the decompressed condition remain in some of the RAMs 2d, there might be generated a false alarm on the basis of a single large judgment value due to variations in judgment values, though the tire is in a normal condition.

Therefore, the present embodiment has employed an arrangement in which memories of all of the RAMs 2d are cleared by the running memory clearing means in the case where it is judged that a tire has reassumed a normal internal pressure, so that the judgment of decompression can be started from the beginning.

After judging a decompressed condition in a tire, the tire is made to reassume a normal internal pressure, and immediately after determining that the display 3 has indicated a recovery to normal internal pressure, all of the RAMs 2d related to this judgment are cleared. With this arrangement, an apparatus which repeatedly, but erroneously judges a decompressed condition immediately after judging a normal internal pressure condition and thus would generate an alarm, can be prevented.

Next, there will be an apparatus for signaling a decrease in tire air-pressure according to another embodiment of the present invention. In this embodiment, the above-mentioned four-wheeled vehicle of normal type might be replaced by a four-wheeled vehicle of FF (front engine-front drive) type which is equipped with a limited slip differential device (hereinafter called "LSD") 7 at a differential gear 6 of a driving shaft 8 as shown in FIG. 1. Note that 5 denotes a following shaft.

In a vehicle equipped with an LSD 7, judgment of decompression is performed individually for each running mode (region), namely left turn, straight-ahead and right turn. In regions of turning movements, variations in judgment values are small, and it seldom happens that it is judged that a tire assumes a normal internal pressure though it is actually in a decompressed condition. In contrast to this, since variations in judgment values are large in a region of straight-ahead running, it might be judged that a tire assumes a normal internal pressure even though it is actually in a decompressed condition. Due to this fact, in the case it is erroneously judged that a tire assumes a normal internal pressure though it is actually in a decompressed condition during straight-ahead running and all of the RAMs 2d are cleared, memory values of all of the RAMs 2d for judging a decompressed condition which have been stored during turning movements are also cleared so that judgment of decompression must be started again from the beginning, thereby taking time for the judgment.

Therefore, the present embodiment has been so arranged that only memories related to straight-ahead running stored in RAMs 2d are cleared in the case where it is judged that during a straight-ahead running a normal internal pressure has been reassumed from a condition in which the tire has been judged to be in a decompressed condition, and that memories related to turning movements and straight-ahead running stored in RAMs 2d are cleared in case it is judged during turning movements that a normal internal pressure has been reassumed from a condition in which the tire has been judged to be in a decompressed condition.

Figure 3:
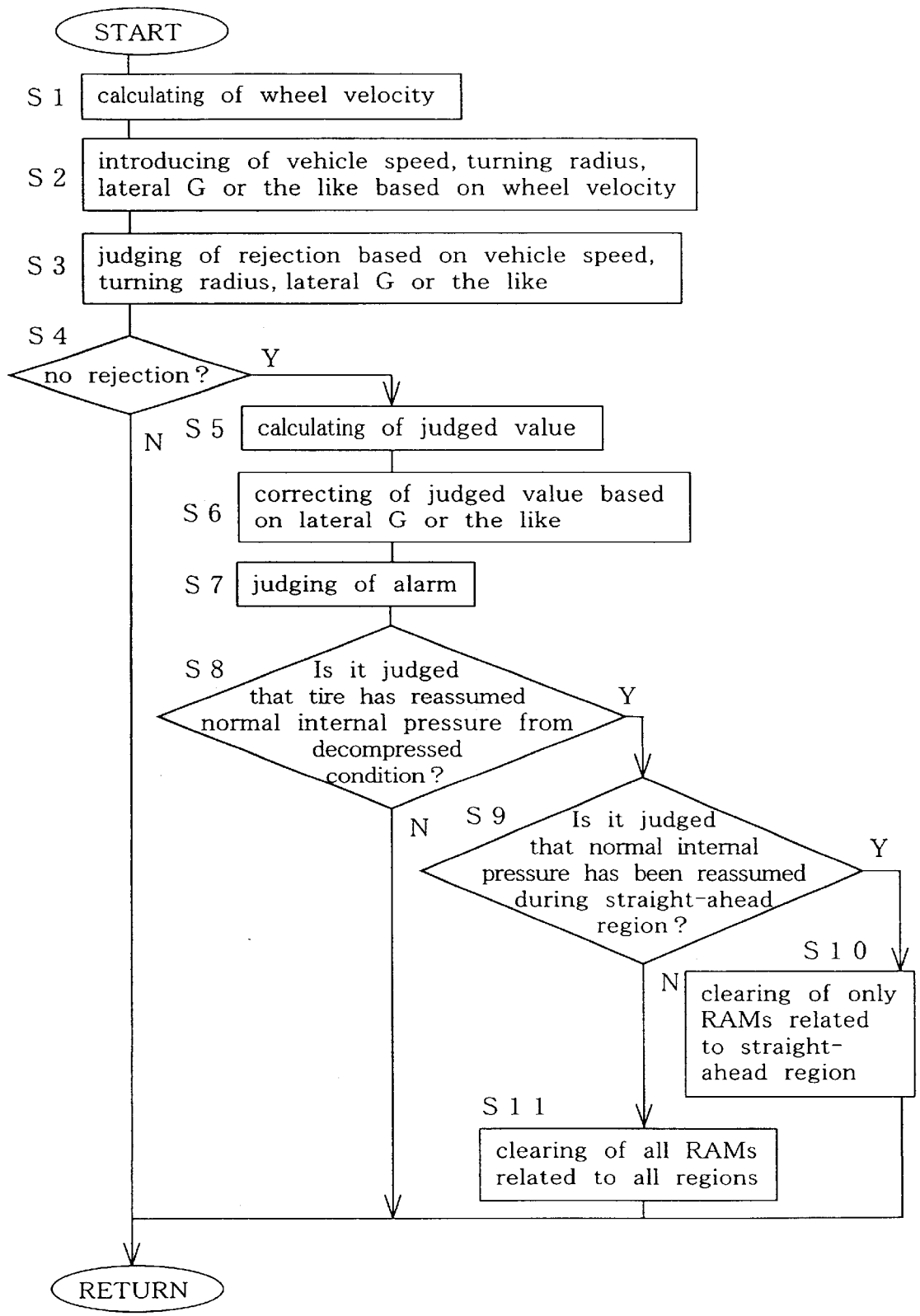
FIG. 3 is a flow chart.

Therefore, the following steps as shown in FIG. 3 are performed in the present embodiment: after performing a calculation of the wheel velocity (Step S1), vehicle speed and turning radius of the wheels are calculated based on the wheel velocity, while lateral G is calculated based on the average velocity and the turning radius of the wheels (Step S2). Based on calculated values related to the vehicle speed and others, it is judged that, for instance, the rotating angular velocity is to be rejected or not (Step S3). In case nothing is to be rejected (Step S4), a judgment value is calculated (Step S5).

The judgment value D is calculated by the following equation (1) utilizing a difference between two diagonal sums.

$$D = \frac{\frac{F11+F14}{2} - \frac{F12+F13}{2}}{\frac{F11+F12+F13+F14}{4}} \quad (1)$$

Here,

F1(X): rotational angular velocity of wheel (tire)

X : 1=front left tire, 2=front right tire, 3=rear left tire, 4=rear right tire.

After performing correction of the judgment value D based on the lateral G or the like (Step S6), it is judged whether an alarm is to be generated (Step S7). In the present embodiment, it is then judged whether a tire has reassumed a normal internal pressure from the decompressed condition (Step S8). If it is judged that such a judgment has not been made, the same step is repeated. On the other hand, in the case it is judged that such a judgment has been made, it is again judged whether the normal internal pressure has been reassumed during straight-ahead running (Step S9). If it is judged that the normal internal pressure has been reassumed during straight-ahead running, only RAMs related to straight-ahead running are cleared (Step S10), and if it is judged that the normal internal pressure has not been reassumed during straight-ahead running, RAMs related to turning movements and straight-ahead running are cleared (Step S11).

With this arrangement, even though it is erroneously judged during straight-ahead running that the internal pressure is normal, RAMs related to regions for turning movements are not cleared, so that it can be immediately judged that a decompressed condition is present when the vehicle enters turning movements. Moreover, in case it is judged during turning movements that a normal internal pressure is reassumed, RAMs elated to turning movements and straight-ahead running are cleared, so that false alarms can be prevented.

As explained here-in-above, the present invention is so arranged that all of the RAMs related to the judgment are cleared immediately after judging that a normal internal pressure has been reassumed after judgment of a decompressed condition. Thus, there can be prevented the situation where the apparatus repeatedly but erroneously judges a decompressed condition to generate an alarm immediately after judging a normal internal pressure condition.

Further in case of a vehicle equipped with an LSD, it will take time until decompression is properly judged in case all of the RAMs are cleared upon judging during straight-ahead driving that the internal pressure is normal although a tire is actually decompressed. For preventing this from happening, only RAMs related to regions for straight-ahead running are cleared after judging a normal internal pressure in a straight-ahead region, and RAMs for all regions are cleared after judging a normal internal pressure in a turning movement region. With this arrangement, even though it is erroneously judged in a straight-ahead running region that the internal pressure is normal, RAMs related to regions for turning movements are not cleared, so that it can be immediately judged that a decompressed condition is present when the vehicle enters turning movements. Moreover, in case it is judged during turning movements that a normal internal pressure is reassumed, RAMs related to turning movements and straight-ahead running are cleared so that false alarms can be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for detecting a decrease in tire air-pressure based on rotational information obtainable from tires of a four-wheeled vehicle, wherein the memory of isokinetic random access memory devices used for determining tire decompression from the beginning, are cleared in case it is ascertained that a normal internal pressure has been reassumed based on said rotational information after a tire has been judged to be in a decompressed condition.

2. An apparatus for detecting a decrease in tire air-pressure based on rotational information obtainable from sensors operatively associated with the tires of a four-wheeled vehicle, wherein the apparatus includes a running memory clearing means for clearing memories of isokinetic random access memory devices used for determining tire decompression from the beginning in case it is ascertained that a normal internal pressure has been reassumed based on said rotational information, after a tire has been judged to be in a decompressed condition.

3. A method for detecting a decrease in tire air-pressure based on rotational information obtainable from tires of a four-wheeled vehicle equipped with a limited slip differential device, wherein in the case it is judged that a normal internal pressure has been reassumed after a tire has been determined to be in a decompressed condition when the vehicle is performing running in a substantially straight manner in a region in which driving wheels are rotating at identical velocities, the memory of isokinetic random access memory devices corresponding to the straight-ahead running are cleared; and wherein in the case it is judged that a normal internal pressure has been reassumed based on said rotational information after a tire has been determined to be in a decompressed condition when the vehicle is performing turning movements in a region in which the driving wheels are not rotating at identical velocities, the memory of isokinetic random access memory devices corresponding to the straight-ahead running and the turning movements are cleared.

4. An apparatus for detecting a decrease in tire air-pressure based on rotational information obtainable from sensors operatively associated with the tires of a four-wheeled vehicle equipped with a limited slip differential device, wherein the apparatus comprises a running memory clearing means which clears the memory of isokinetic random access memory devices corresponding to only straight-ahead running in case it is determined that a normal internal pressure has been reassumed after a tire has been determined to be in a decompressed condition when the vehicle is performing running in a substantially straight manner in a region in which the driving wheels are rotating at identical velocities, and which clears the memory of isokinetic random access memory devices corresponding to straight-ahead running and turning movements in case it is determined that a normal internal pressure has been reassumed based on said rotational information, after a tire has been judged to be in a decompressed condition when the vehicle is performing turning movements in a region in which the driving wheels are not rotating at identical velocities.

* * * * *